United States Patent
Van Thournout et al.

(10) Patent No.: US 8,628,694 B2
(45) Date of Patent: Jan. 14, 2014

(54) HIGH VOLTAGE NEGATIVE ACTIVE MATERIAL FOR A RECHARGEABLE LITHIUM BATTERY

(75) Inventors: Michèle Van Thournout, Ellezelles (BE); Laure Monconduit, Jacou (FR); Claire Villevieille, Marguerittes (FR); Josette Olivier-Fourcade, Jacou (FR); Jean-Claude Jumas, Jacou (FR); Cécile Tessier, Bruges (FR)

(73) Assignees: Umicore, Brussels (BE); Centre National de la Recherche Scientifique, Paris-Cedex (FR); Universite Montpellier, Montpellier Cedex; SAFT Groupe S.A., Bagnolet (FR)

( * ) Notice: Subject to any disclaimer, the term of this patent is extended or adjusted under 35 U.S.C. 154(b) by 116 days.

(21) Appl. No.: 13/260,760

(22) PCT Filed: Feb. 10, 2010

(86) PCT No.: PCT/EP2010/000794
§ 371 (c)(1),
(2), (4) Date: Dec. 23, 2011

(87) PCT Pub. No.: WO2010/112103
PCT Pub. Date: Oct. 7, 2010

(65) Prior Publication Data
US 2012/0097890 A1    Apr. 26, 2012

Related U.S. Application Data

(60) Provisional application No. 61/202,777, filed on Apr. 3, 2009.

(30) Foreign Application Priority Data

Mar. 30, 2009    (EP) .................................... 09290231

(51) Int. Cl.
*H01B 1/08* (2006.01)
*C01G 23/04* (2006.01)

(52) U.S. Cl.
USPC .................................. 252/519.12; 252/520.21

(58) Field of Classification Search
USPC ..................... 252/519.12, 520.21; 429/231.95
See application file for complete search history.

(56) References Cited

U.S. PATENT DOCUMENTS

| | | | |
|---|---|---|---|
| 5,658,693 A * | 8/1997 | Thackeray et al. | ........... 429/224 |
| 2009/0042095 A1 * | 2/2009 | Inagaki et al. | ................... 429/92 |

(Continued)

FOREIGN PATENT DOCUMENTS

| | | |
|---|---|---|
| EP | 1623473 | 2/2006 |
| WO | WO 2004100292 | 11/2004 |
| WO | WO 2009074208 | 6/2009 |

OTHER PUBLICATIONS

Arroyo et al., "Electrochemical Lithium Intercalation in Li2Ti3O7—Ramsdellite Structure," Material Research Bulletin, vol. 32, No. 8, (1997), pp. 993-1001.

(Continued)

Primary Examiner — Mark Kopec
(74) Attorney, Agent, or Firm — Brinks Gilson & Lione

(57) ABSTRACT

The invention relates to active material for the negative electrode of secondary rechargeable lithium batteries, wherein the active material is based on doped or undoped carbon-bearing lithium titanium ramsdellite oxide with general formula $Li_2Ti_3O_7$ or $Li_{2.28}Ti_{3.43}O_8$. The active material comprises a carbon substituted ramsdellite phase having a general formula $L_{i2-4c}C_c$—$Ti_3O_7$, with $0.1<c<0.5$, and more than 0.1 mol % of spinel phase having a general formula $Li_{1+x}Ti_{2-x}O_4$ with $0<x<0.33$.

16 Claims, 6 Drawing Sheets

(56) References Cited

U.S. PATENT DOCUMENTS

Figure 1:
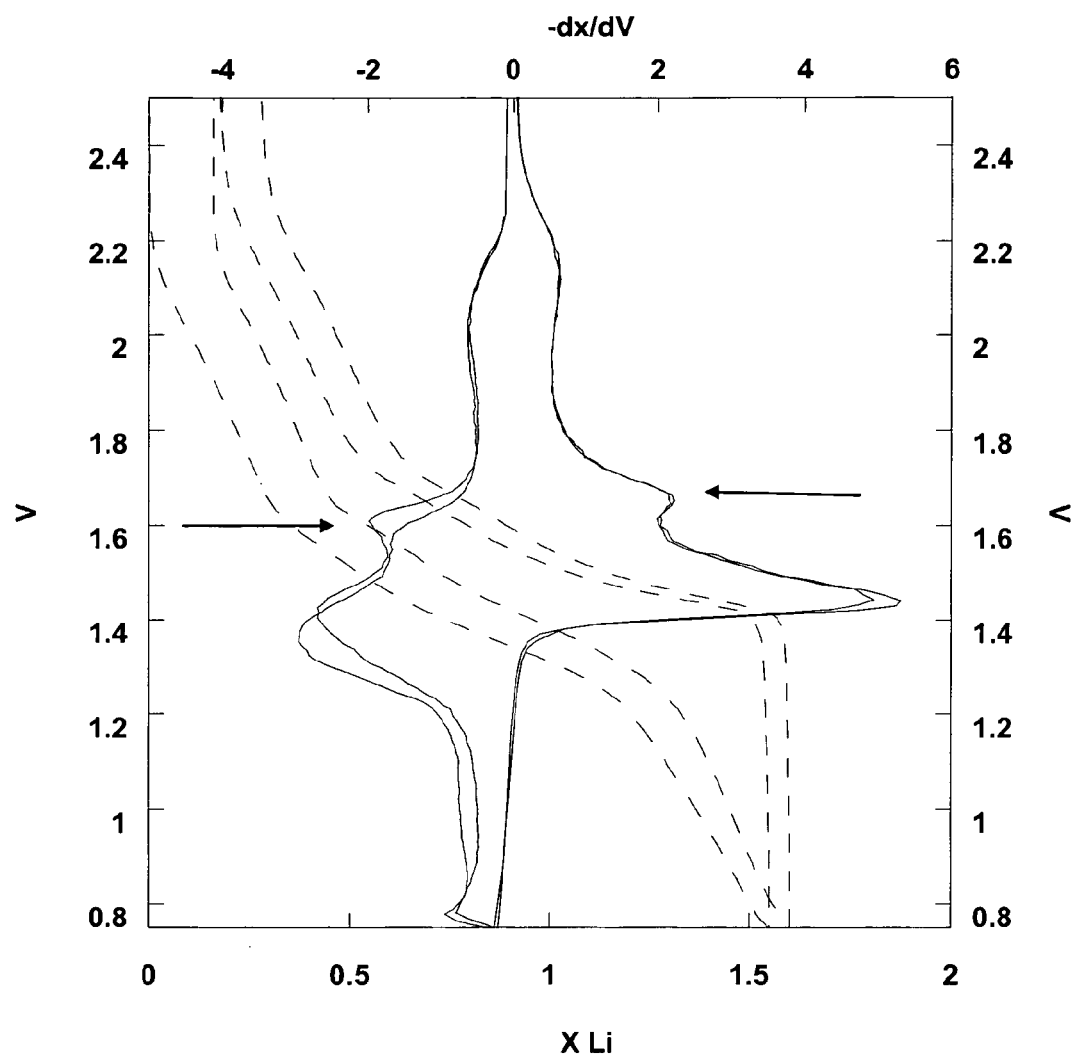

2009/0081551 A1* 3/2009 Hoshina et al. .......... 429/231.95
2011/0042628 A1 2/2011 Levasseur et al.

OTHER PUBLICATIONS

Ferg et al., "Spinel Anodes for Lithium-Ion Batteries," Journal of Electrochemical Society, vol. 141, No. 11, (1994), pp. L147-L150.

Gover et al., "Investigation of Ramsdellite Titanates as Possible New Negative Electrode Materials for Li Batteries," Journal of the Electrochemical Society, vol. 146, No. 12, (1999), pp. 4348-4353.

International Preliminary Report on Patentability, issued in PCT/EP2010/000794, dated Oct. 13, 2011.

International Search Report, issued in PCT/EP2010/000794, dated Mar. 23, 2010.

Izquierdo et al., "Phase Equilibria in the System Li2O—TiO2," Materials Research Bulletin, vol. 15, No. 11, (1980), pp. 1655-1660.

Van Thournout et al., "Metal-Doped $Li_2Ti_3O_7$ with Ramsdellite Structure as High Voltage Anode for New Generation Li-ion Batteries," Journal of Power Sources, vol. 174, No. 2, (2007), pp. 1270-1274.

* cited by examiner

HIGH VOLTAGE NEGATIVE ACTIVE MATERIAL FOR A RECHARGEABLE LITHIUM BATTERY

This application is a National Stage application of International Application No. PCT/EP2010/000794, filed Feb. 10, 2010, which claims the benefit of U.S. Provisional Application No. 61/202,777, filed Apr. 3, 2009, the entire contents of which are hereby incorporated herein by reference. This application also claims priority under 35 U.S.C. §119 to European Patent Application No. 09290231.1, filed Mar. 30, 2009, the entire contents of which are hereby incorporated herein by reference.

The invention relates to active material for the negative electrode of secondary rechargeable lithium batteries, wherein the active material is based on doped or undoped carbon-bearing lithium titanium ramsdellite oxide with general formula $Li_2Ti_3O_7$ or $Li_{2.28}Ti_{3.43}O_8$.

Anode materials for rechargeable lithium batteries are generally selected from the carbon group. Carbon materials might have security issues in extreme conditions. First, while charging at very fast rates and/or at low temperature, Li can deposit at the surface of carbon and hence the formation of lithium dendrites can induce soft short. Second, abusive overheating induces the dissolution of the passivation layer made of the reduction products of electrolyte's solvents at the potential of graphite; and the resulting continuous reduction of solvents can be a first step to thermal run away.

Numerous efforts have been made to find alternative electrochemical active anode materials to replace graphite. Notably, lithium titanium oxides, such as the spinel phase $Li_4Ti_5O_{12}$ as related in Journal of Electrochemical Society 141 (1994) L147, or the ramsdellite phase $Li_2Ti_3O_7$ as reported in Material Research Bulletin 32 (1997) 993, have been proposed due to several advantages versus carbon: i.e. a higher average voltage around 1.5V vs. Li, improving the security while cycling, a low irreversible loss and a lower polarization. The spinel structure inserts lithium in a two-phase process due to the spinel to rocksalt phase transition, presenting a 1.55V vs. Li plateau, and acquiring a maximum capacity of 175 Ah/kg, whilst the ramsdellite inserts lithium topotactically in a solid solution with a flat S-shape charge-discharge curve corresponding to a one-phase process at a voltage range of 1-2V vs. Li.

Lithium titanate oxide ($Li_2Ti_3O_7$) is regarded as promising negative electrode material because of the low cost of production, and the non-toxicity of titanium. While the theoretical capacity is 198 Ah/kg, in practice the reversible capacities are between 120 and 130 Ah/kg for low current densities (C/15) and attain only 110 Ah/kg at higher current densities (C). As a consequence the reversible capacity, the polarisation observed upon lithium insertion and the required high temperature for the firing process strongly limit the application field of this compound.

A lower synthesis temperature and better cyclability at low current density can be achieved by substitution of a small amount of $Ti^{4+}$ by $Fe^{3+}$ in $Li_2Ti_3O_7$, using a ceramic route. However, the first discharge curve shows a plateau due to the transformation $Fe^{3+}/Fe^{2+}$, which limits the reversible capacity, and the other performances are not improved, compared with $Li_2Ti_3O_7$. According to EP1623473 B1, the reversible capacity can be improved to 140 Ah/kg when the lithium titanium oxide having the ramsdellite structure, according to the general formula $Li_{2+v}Ti_{3-w}Fe_xM_yM'_zO_{7-\alpha}$, is co-substituted with one or two of the following elements: $Ti^{3+}$, $Co^{2+}$, $Co^{3+}$, $Ni^{2+}$, $Ni^{3+}$ $Cu^{2+}$, $Mg^{2+}$, $Al^{3+}$, $In^{3+}$, $Sn^{4+}$, $Sb^{3+}$, $Sb^{5+}$. Substituted materials are obtained at lowered synthesis temperatures, which decreases the production cost.

Furthermore, according to PCT/EP2008/009763, when the active material contains a carbon richer phase with general formula $Li_{2+v-4c}C_cTi_{3-w}Fe_xM_yM'_zO_{7-\alpha}$, and containing two of the following elements: $Ti^{3+}$, $Co^{2+}$, $Co^{3+}$, $Ni^{2+}$, $Ni^{3+}Cu^{2+}$, $Mg^{2+}$, $Al^{3+}$, $In^{3+}$, $Sn^{4+}$, $Sb^{3+}$, $Sb^{5+}$, the specific reversible capacity is increased to 190 Ah/kg, close to the theoretical value of the ramsdellite lithium titanate. The electrochemical results show an electrochemical curve having a two-step voltage profile, one between 2.2 and 1.6 V and the second under 1.5 V. The material was obtained by grinding and mixing a lithium, titanium and iron compound, a C precursor compound, and a M and M' compound, followed by a sintering process at elevated temperature in a neutral atmosphere.

It is an object of the present invention to further improve the performances in terms of high energy and high specific power, whilst respecting the safety of use and the environment, all of this at a reasonable cost.

This is obtained by a composite negative active material for a lithium battery, comprising a carbon substituted ramsdellite phase having a general formula $Li_{2-4c}C_cTi_3O_7$, with $0.1<c<0.5$, and a spinel phase having a general formula $Li_{1+x}Ti_{2-x}O_4$ with $0<x\leq0.33$, said active material comprising more than 0.1 mol % of spinel phase, and preferably more than 1 mol %. In one embodiment, this to composite negative active material comprises at least 99 mole %, and preferably at least 99.9 mole % of both of said carbon substituted ramsdellite phase having a general formula $Li_{2-4c}C_cTi_3O_7$ and said spinel phase having a general formula $Li_{1+x}Ti_{2-x}O_4$ with $0<x\leq0.33$.

Also claimed is that said carbon substituted ramsdellite phase further comprises elements Fe, M and M', and has a general formula $Li_{2-4c}C_cTi_{3-w}Fe_xM_yM'_zO_{7-\alpha}$, wherein M and M' are metal ions having an ionic radius between 0.5 and 0.8 Å and forming an octahedral structure with oxygen; wherein $-0.5\leq v\leq+0.5$; $y+z>0$; $x+y+z=w$ and $0<w\leq 0.3$; $0.1<c\leq(2+v)/4$, and $\alpha$ is related to the formal oxidation numbers n and n' of M and M' by the relation $2\alpha=-v+4w-3x-ny-n'z$, where n and n' are the formal oxidation numbers of M and M' respectively.

Preferably M and M' are different metals selected from the list consisting of $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^{3+}$, $Sb^{5+}$; and preferably $M=Ni^{2+}$ and $M'=Al^{3+}$.

The active material described above preferably has a carbon content of 1.0 to 1.5 wt %. Also preferred is a spinel content between 5 and 16 mole %, and even between 8 and 11 mole %.

The invention also covers a secondary rechargeable battery having an anode material described before.

The negative active electrode material according to the invention is constituted of a composite material containing principally the undoped or doped C-bearing $Li_2Ti_3O_7$ ramsdellite phase and a second phase of spinet type $Li_{1+x}Ti_{2-x}O_4$, with $0<x\leq0.33$. For $x=0.33$ the second phase is constituted of $Li_4Ti_5O_{12}$. The ramsdellite structure comprises a lattice composed of Ti and Li in an octahedral environment and channels partially occupied by Li atoms in a tetrahedral environment. The structural lithium and titanium distribution can be described with the general formula: $(Li_{1.72}\square_{2.28})_c[Ti_3Li_{0.57}]_lO_8$, where the lithium atoms are distributed in the channels (c) and in the Octahedral sites (l) and with 2.28 vacancies in the channels, free for lithium insertion during electrochemical reaction. Carbon introduced into the structure will substitute partially the tetrahedral lithium atoms from the channels by forming $CO_3^{2-}$ groups in a three oxygen plane. The lithium deficiency in the ramsdellite phase is compensated by the formation of a lithium richer phase, $Li_{1+x}Ti_{2-x}O_4$ $0<x\leq0.33$.

It is possible to establish an optimum in carbon content so as to provide for a maximum of spinel phase. This optimum is situated at 1 to 1.5 wt % C, giving a spinel content of 11 to 16 mole %. An eventual carbon excess will partially be deposited on the intergrain section as a coating.

Although is it a particular advantage of the active material of the main embodiment of the present invention that there is no need to add dopants to the ramsdellite phase, nor to substitute the Ti by other elements to obtain capacities that are higher than those mentioned in PCT/EP2008/009763, it can be for particular reasons that the ramsdellite phase comprises dopants or elements. For example, a lower temperature for the synthesis and a better cyclability at low current density can be achieved by substitution of a small amount of $Ti^{4+}$ by $Fe^{3+}$ in $Li_2Ti_3O_7$; and elements M and M' can further improve the electrochemical performances, by increasing the number of possible sites for the inserted lithium or by making easier the accessibility of the existing vacant sites. Other potential advantages are mentioned in EP1623473 B1.

In another embodiment of the present invention, a rechargeable lithium battery is provided comprising the negative active material. This battery comprises the anode active material as described above; a known cathode active material capable of reversible intercalating/deintercalating the lithium, such as high voltage positive active material constituted of lithium intercalated compounds comprised in the oxides (e.g. $LiCoO_2$, $LiNi_{0.33}Mn_{0.33}Co_{0.33}O_2$, $LiNi_{0.80}Co_{0.15}Al_{0.05}O_2$ or $LiMn_2O_4$) and phosphate materials (e.g. $LiFePO_4$); and a known electrolyte, such as a solution containing $LiPF_6$ as will be described below. A rechargeable lithium battery using this material as an anode exhibits an increased capacity at high current density, with a smooth electrochemical curve in the range 1-2.5V, and having a high capacity retention after cycling compared to the prior art Li—Ti—O ramsdellite compounds. The theoretical capacity value of 180-200 Ah/kg is obtained at current densities of 10 A/kg, in the above mentioned range of 1-2.5V.

The invention further covers a method of manufacturing the negative electrode active material described above, comprising the steps of grinding and mixing a lithium compound, a titanium compound, a C precursor compound, and eventually an iron compound and a M and M' compound, by ball milling, followed by a sintering process at a temperature above 950° C., and a quenching step of the sintered material, where the sintering process is performed in a gaseous atmosphere comprising a reducing agent.

The reducing agent preferably is either one or more of the group consisting of hydrogen, a hydrocarbon, and carbon monoxide. Also preferably, the gaseous atmosphere comprising a reducing agent consists of argon gas.

Especially preferred is a gaseous atmosphere consisting of an argon-hydrogen mixture with 1 to 10 vol % $H_2$, and even 3 to 10 vol % $H_2$.

This process is fast and its cost is low.

The invention is further disclosed in the following detailed description and accompanying Figures:

FIG. 1: Galvanostatic charge/discharge curves (dotted lines) at C/10 rate of the active composite material of the invention (Example 2), and its derivatives dx/dV (full lines). In the figure x means the number of lithium inserted and V the potential.

Figure 2A:
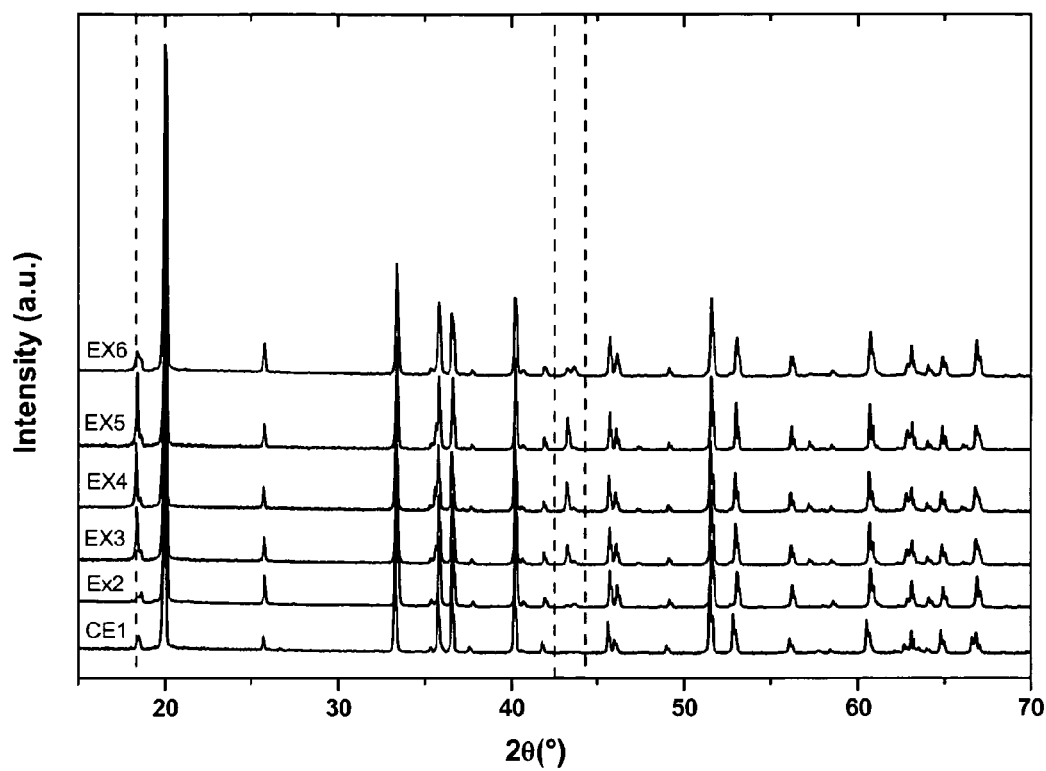
Figure 2B:
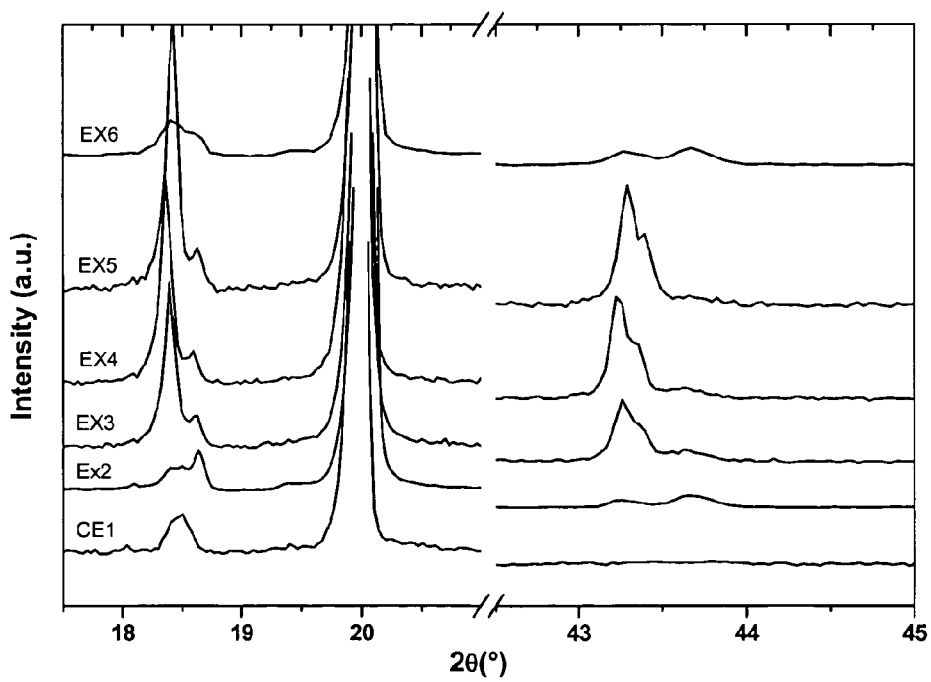

FIG. 2a, 2b: XRD of the synthesized materials obtained with different carbon contents.

Figure 3:
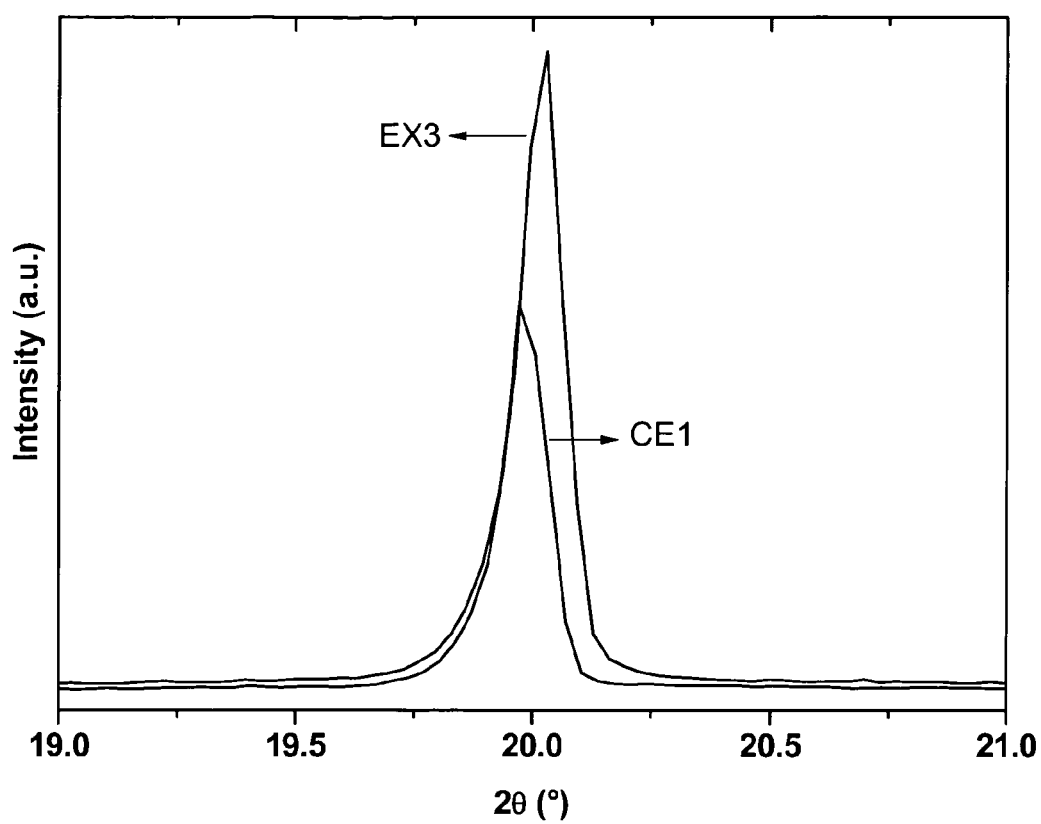

FIG. 3: XRD peak profile of the principal peak of the synthesized materials containing 0% carbon (Counterexample 1) and 1.09 wt % carbon (Example 3).

Figure 4:
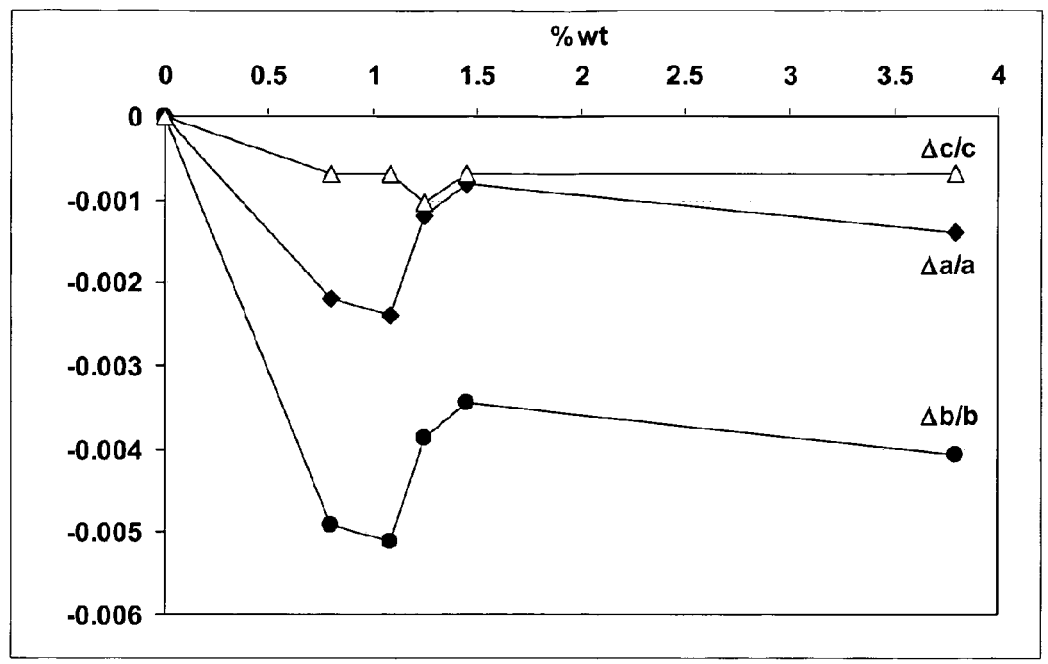

FIG. 4: Evolution of the lattice parameters $\Delta a/a$, $\Delta b/b$ and $\Delta c/c$ refined in the orthorhombic space group Pbnm, in function of the carbon content.

Figure 5:
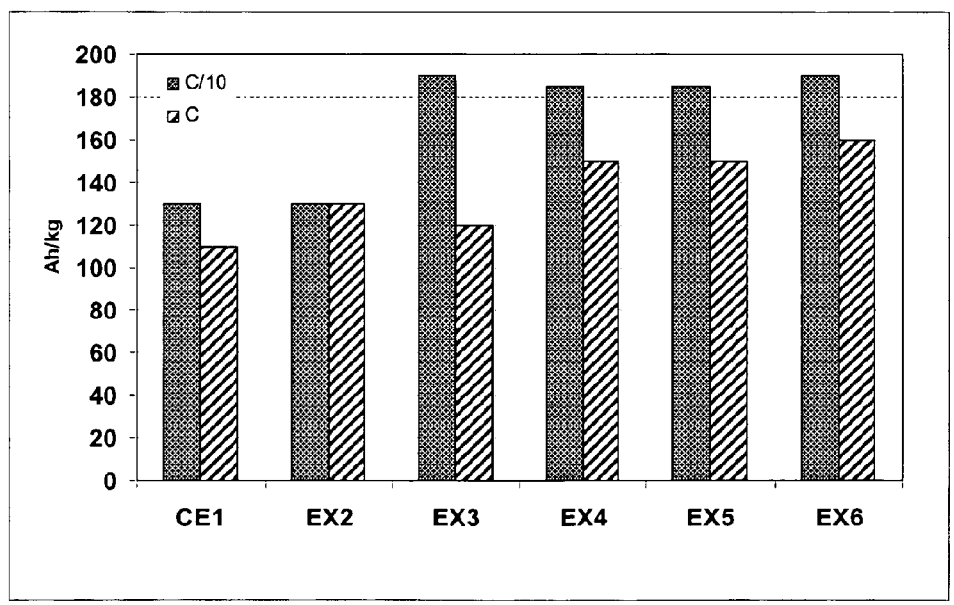

FIG. 5: Capacity values in Ah/kg at C/10 and C rate of CE1 and Ex. 2-6.

Figure 6:
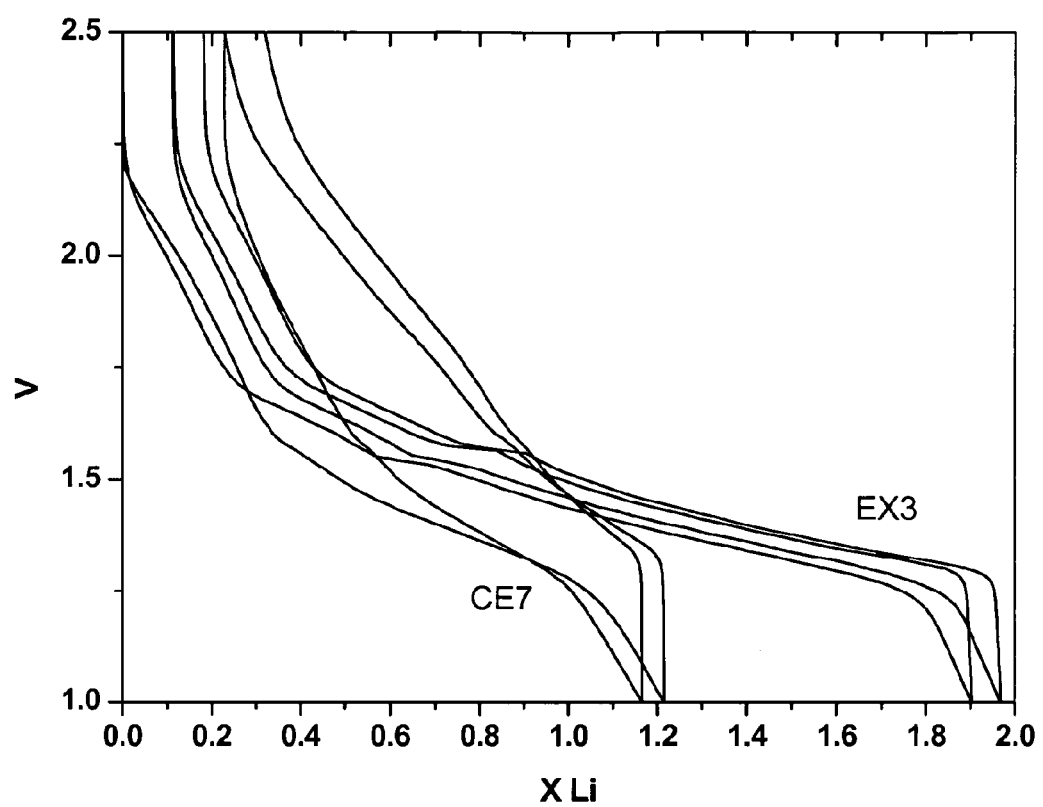

FIG. 6: Galvanostatic charge/discharge curves at C/10 rate in the range of 1-2.5 V of the active composite material of the invention (Example 3) and the Counterexample 7 (composite material obtained by ex-situ mixing).

Figure 7:
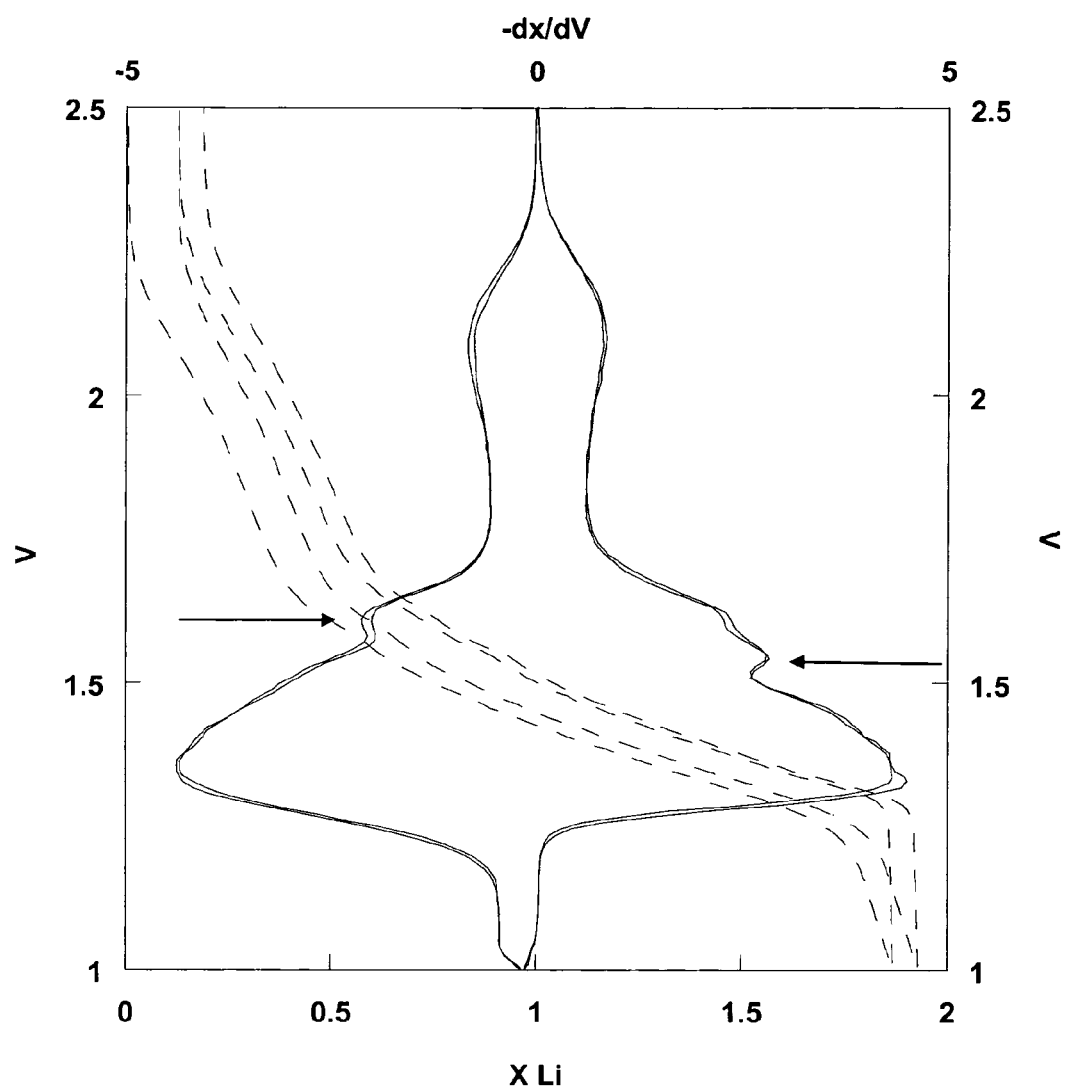

FIG. 7: Galvanostatic charge/discharge curves (dotted lines) at C/10 rate of the active composite material of the invention (Example 8), and its derivatives dx/dV (full lines). In the figure x means the number of lithium inserted and V the potential.

The negative electrode material of the invention is a composite material containing two active phases, ramsdellite and spinel, which is formed by a partial substitution of carbon in the lithium tetrahedral sites in the channels. The modified ramsdellite is the major active phase and acts as a support material. The as-formed composite material mainly inserts lithium topotactically in a solid solution in the range of 1 and 2.5 V. The negative electrode material provides high gravimetric and volumetric capacity results (between 180 and 200 Ah/kg, at 570 to 635 Ah/m³) and conserving the advantages related to the undoped material:

A low irreversible capacity, between 5 and 15 Ah/kg;
An excellent cycling ability;
A low polarisation between 50 and 90 mV at C/10 rate.

The compounds according to the invention can be prepared in-situ in a ceramic process preferably using the following steps:

A reactive mechanical grinding and mixing step in a planetary ball mill of a precursor mixture comprising a lithium compound, a titanium compound, metal element compounds If present, and a carbon compound; using defined to parameter conditions (container loading, number of beads, speed and time of grinding);

A one step thermal treatment under controlled atmosphere using a high rate temperature ramp until the reaction temperature;

A plateau at the reaction temperature;

A fast quenching step until room temperature under controlled atmosphere.

In this method, each metallic element can be selected from a metal oxide or an inorganic or organic solid precursor of said metal oxide. Preferably, the following oxides are considered: lithium oxide ($Li_2O$) or its precursors and titanium oxide (anatase $TiO_2$) or a mixture of two titania phases, anatase and rutile. The proportion of each oxide in the precursor mixture corresponds to the stoichiometric proportion of the support material.

The carbon compound is preferably chosen from known solid hydro-carbonaceous compounds containing either short chains (i.e. sucrose, saccharose), either long chains (i.e. cellulose, starch) or cyclic chains (i.e. ascorbic acid). Known hydro-carbonaceous phases such as oses or compounds thereof, for example glucose, fructose, sucrose, ascorbic acid, polyosides correspond to the condensation of the oses such as starch, cellulose and glycogen, are preferred. The proportion of the carbon in the composite material will be calculated taking into account the carbon decomposition into CO and $CO_2$ in the gas flow during the thermal treatment, depending on the used hydro-carbonaceous compound. The carbon proportion can be adjusted in case an excess is preferred at the inter-grain sections. The formation and deposition of pyrolitic carbon at the grains intersections improves the material's conductivity, acting as a conductive coating.

The thermal treatment is realized under reducing atmosphere, at high temperature, i.e. above 950° C., and preferentially between 980° C. and 1050° C. is during 1h30-2h, in order to obtain a high crystallinity and limited particle size.

It is followed by a quenching step to room temperature, where the produced phases are metastable. During the high temperature step the lithium in the (doped) $Li_2Ti_3O_7$ phase is substituted with active carbon (and hence there is a maximum of C possible in the structure), which is able to create covalent bondings in order to form Ti—O—C. This connection behaves as a $CO_3^{2-}$ type group in a 3 oxygen plane. The lithium deficiency in the ramsdellite phase is compensated by the formation of a lithium richer phase of spinel type $Li_{1+x}Ti_{2-x}O_4$, with $0<x\leq0.33$.

The use of $Ar/H_2$ gas promotes the formation of a composite constituted of only two electrochemical active phases, i.e. a ramsdellite and spinel phase. It is believed that the reducing agent $H_2$ in the gas mixture enables the formation of mixed valence titanium ($Ti^{3+}/Ti^{4+}$) as a solid solution in the ramsdellite phase. Other reducing agents and carrying gasses, like the gas mixture $N_2/H_2$, provide less pure active phases. For example, a ramsdellite phase close to the $TiO_2$ structure and a lithium richer phase, $Li_2TiO_3$, which is electrochemical inactive, can additionally be obtained. Hence, it is not excluded that impurities occur in the present invention, but they can be quantitatively limited to <1 mol % or even less.

It can be concluded that the material and the manufacturing process of the invention allow, in the field of the rechargeable lithium battery application,

- to improve the gravimetric and volumetric capacities and the performances of the titanium based negative electrode materials, both doped and undoped, of the prior art;
- to obtain a secure cycling potential; and
- to obtain a high reversibility according to a low irreversible capacity at the first cycle.

The following examples further illustrate the invention in detail:

COUNTEREXAMPLE 1

Counterexample 1 (CE1) concerns undoped $Li_2Ti_3O_7$ material. The synthesis process is performed by ceramic route. A reactive mechanical grinding step of a stoichiometric mixture of the precursors $Li_2CO_3$ (0.5489 g), nano sized $TiO_2$ (anatase/rutile) (1.7805 g) is performed in a Fritsch planetary ball milling Pulverisette® 7 (15 min at speed 8) using agathe beads (mass is 10 times higher than the powder input). The thermal treatment of the powder is realized in an alumina tray under $Ar/H_2$ (95/5) atmosphere with a one step heating process: a heating ramp of 7° C./min until a final temperature step of 980° C. maintained during 1h30 followed by a fast cooling step where the material is quenched until room temperature under controlled gas flow in order to stabilize the ramsdellite structure.

EXAMPLE 2

Example 2 concerns carbon substituted $Li_2Ti_3O_7$ material according to the invention. The synthesis process is performed by ceramic route. A reactive mechanical grinding step of a stoichiometric mixture of the precursors $Li_2CO_3$ (0.5213 g), nano sized $TiO_2$ (anatase/rutile) (1.6911 g), sucrose (0.100 g) is performed in a Fritsch planetary ball milling Pulverisette® 7 (15 min at speed 8) using agathe beads (mass is 10 times higher than the powder input). The thermal treatment of the powder is realized in an alumina tray under $Ar/H_2$ (95/5) atmosphere with a one step heating process: a heating ramp of 7° C./min until a final temperature step of 980° C. maintained during 1h30 followed by a fast cooling step where the material is quenched until room temperature under controlled gas flow in order to stabilize the ramsdellite structure. The carbon content of the final material has also been analyzed by combustion of the material. The carbon content is 0.8 wt %, which corresponds to 0.18 mole carbon per mole final product.

Due to the low precision when using the X-ray diffractogram of the final product to determine the presence of a phase other than ramsdellite, it is difficult to determine how much spinel phase is present in the final product of Example 2. When the electrochemical properties of the composite material are measured however the presence of a spinel phase is indeniable. Electrochemical measurements are performed with two electrodes cells in a Swagelok configuration, where the positive electrode comprises a mixture of 85% weight of the composite material according to the invention and 15% weight of conductive carbon black. The negative electrode is a metallic lithium foil used as reference electrode. A mixture solution of ethylene carbonate, dimethyl carbonate and propylene carbonate (1:3:1) including 1M of $LiPF_6$ is used as electrolyte. The charge-discharge tests are carried out under galvanostatic mode at room temperature at current rates of C/10 and C in the potential range 1-2.5V vs $Li/Li^+$ (rate C corresponding to 1 mole Li exchanged, per mole active material per hour).

FIG. 1 shows the galvanostatic charge/discharge curve at 25° C. and C/10 rate (dotted lines) of the composite of Example 2, and its derivative dx/dV (full line). The dx/dV curve exhibits the typical peaks (arrows on FIG. 1) that are characteristic for the presence of the spinel phase, namely shown by the 1.55V vs. Li plateau at the spinel to rocksalt phase transition.

Where the charge-discharge test at C/10 did not show any improvement over the value obtained in CE1 (see Table 3 below), in the charge-discharge test at C the capacity value increased from 110 mAh/g for CE1 to 130 mAh/g for Example 2. Finally, the lattice parameters of the ramsdellite phase are modified according to the carbon content, as shown and discussed in Table 2 below. Although it is difficult to express the presence of spinel quantitatively, for Example 2 it must be at least 0.1 mole %, and probably around 1 mole %.

EXAMPLE 3 TO 6

Examples 3 to 6 concern carbon substituted $Li_2Ti_3O_7$ material using the stoichiometric mixtures of the precursors in Table 1. The grinding and firing steps are identical to what is described in Example 2.

TABLE 1

| | Mixture composition of Examples 3 to 6. | | |
|---|---|---|---|
| | $Li_2CO_3$ | $TiO_2$ | sucrose |
| EX3 | 0.4939 g | 1.6022 g | 0.200 g |
| EX4 | 0.4665 g | 1.5133 g | 0.300 g |
| EX5 | 0.4391 g | 1.4242 g | 0.400 g |
| EX6 | 0.3842 g | 1.2461 g | 0.600 g |

For Examples 3-6, the carbon content of the final material is also analyzed by combustion of the material. The carbon content varies from 1.09 to 3.8 wt % which corresponds to 0.29 to 0.93 mole carbon per mole final product (see Table 3 below).

In FIGS. 2a and 2b, the X-ray diffractograms of the obtained materials show predominantly the ramsdellite phase. The substitution of active carbon in the ramsdellite support structure, for carbon contents>0.8% wt, is compensated by the formation of the lithium rich spinel phase $Li_4Ti_5O_{12}$ or $Li_{1+x}Ti_{2-x}O_4$ $0<x\leq0.33$ having characteristic peaks at 18.34 and 43.08° 2θ (λ CuKα). No other phases can be detected on the X-ray diffractograms, supporting the fact that the sintering process is preferably to take place in an argon-hydrogen atmosphere. FIG. 2b shows a magnified view of the spinet peaks. As mentioned before, the spinel phase is only emerging in Example 2, and is more pronounced in Examples 3 to 6.

FIG. 3 shows the difference in the full width at half maximum (FWHM) of the peak profiles between the undoped material (CE1) and the carbon substituted material of Example 3. This indicates clearly that the carbon contribution during the synthesis process modifies the structural properties of the ramsdellite material.

The lattice parameters of the ramsdellite phase are altered according to the carbon content, as shown in Table 2.

TABLE 2

Lattice parameters of the ramsdellite phases

| Examples | C (% wt) | a (Å) | b (Å) | c (Å) |
|---|---|---|---|---|
| CE1 | 0 | 5.018 | 9.575 | 2.947 |
| 2 | 0.80 | 5.006 | 9.528 | 2.945 |
| 3 | 1.09 | 5.005 | 9.526 | 2.945 |
| 4 | 1.25 | 5.011 | 9.538 | 2.944 |
| 5 | 1.45 | 5.013 | 9.542 | 2.945 |
| 6 | 3.80 | 5.010 | 9.536 | 2.945 |

In FIG. 4 the relative difference of the lattice parameters of Ex. 2-6 in Table 2 against the value for CE1 ($\Delta a/a_{CE1}$; $\Delta b/b_{CE1}$; $\Delta c/c_{CE1}$, where $\Delta a=a_{Ex.2-6}-a_{CE1}$; $\Delta b=b_{Ex.2-6}-b_{CE1}$; $\Delta c=c_{Ex.2-6}-c_{CE1}$) are reported in function of the carbon content of the Examples. As the ionic radius of carbon (0.15 Å) is smaller than for lithium (0.59 Å), the introduction of carbon during the synthesis process brings about a contraction of the lattice in particular of the parameters a and b which are the parameters controlling the channels' size in the ramsdellite structure. Above 1.2% wt carbon content, the lattice expands due to the increasing amount of carbon that is substituted in the tetrahedral sites of the channels. The lithium deficiency due to the carbon substitution is compensated by the formation of a lithium richer spinel phase $Li_{1+x}Ti_{2-x}O_4$ ($0<x\leq0.33$), resulting in a ramsdellite/spinel composite.

The electrochemical properties of the composite material according to the invention are measured as was described above, and results are shown in FIG. 5. The negative active electrode material shows increased capacity values for the first cycle, obtained at rates C/10 and C, for carbon contents preferentially above 0.8% wt, yielding a spinel phase between 1 and 16 mole % (see Examples 2 to 6 of FIG. 5). An overview is given in Table 3.

TABLE 3

Capacity and composition of ramsdellite/spinel composite

| Examples | Carbon wt % | Spinel % mol | Ramsdellite % mol | Ramsdellite c mol | Capacity (Ah/kg) Theoretical value | C/10 | C |
|---|---|---|---|---|---|---|---|
| CE1 | 0 | 0 | 100 | 0 | 198 | 130 | 110 |
| EX2 | 0.80 | 1 | 99 | 0.18 | 198 | 130 | 130 |
| EX3 | 1.09 | 11 | 89 | 0.29 | 194 | 190 | 120 |
| EX4 | 1.25 | 15 | 85 | 0.36 | 193 | 185 | 150 |
| EX5 | 1.45 | 16 | 84 | 0.42 | 192 | 185 | 150 |
| EX6 | 3.80 | 8 | 92 | 0.93 | 195 | 190 | 160 |

Table 3 shows that the largest quantity of spinel is obtained when the compound comprises between 1.0 and 1.5 wt % carbon, which also results in the best electrochemical performance of the active material. Once the carbon content exceeds 1.5 wt %, higher electrochemical performances are to be attributed to excess carbon in the compound acting as a conductive coating.

The spinel/ramsdellite ratio has been calculated using Rietveld refinement on the X-ray diffractograms. The carbon content (c mol) has been calculated assuming that only ramsdellite and spinet phases are present in the material. This assumption is based on the XRD analysis of Examples 2-6 discussed above. The theoretical capacity is recalculated according to the carbon substituted composite.

The carbon content expressed in mol in Example 6 exceeds the theoretical value of c (0.5). This means that an excess of carbon deposits at the grains' intersections, acting as a conductive carbon coating.

COUNTEREXAMPLE 7

Counterexample 7 (CE7) concerns a physical mixture of a separately formed $Li_2Ti_3O_7$ ramsdellite material (83.5% wt), a $Li_4Ti_5O_{12}$ spinet material (15% wt) and pyrolyzed carbon (1.5% wt). The synthesis process of both materials is performed by ceramic route. The ramsdellite material is obtained at 980° C. as mentioned above and the spinet material is synthesized at a final temperature of 800° C. according to its reaction temperature. This physical mixture of the three materials is tested in a battery cell and compared to the material related to the present invention, as will be shown below.

The particularity of the in-situ formed lithium rich spinel phase is evidenced in FIG. 6, where high reversible capacity values are obtained (185 Ah/kg) at C/10 rate for EX3 (dotted lines) compared to Counterexample 7 (full lines), where the two active phases and carbon are physically mixed together and tested in the lithium battery as described before. According to the figure low irreversible capacity and low polarisation are also an asset of the present invention.

EXAMPLE 8

Example 8 concerns a 4-element substituted ramsdellite, according to the general formula $Li_{2+v-4c}C_cTi_{3-w}Fe_xNi_yAl_zO_{7-\alpha}$, with v=-0.14, w=0.14, x=0.025, y=0.1, z=0.025 and $0.1\leq c\leq0.465$. A mixture of $Li_2CO_3$ (0.4008 g), $TiO_2$ (1.3348 g), $Fe_2O_3$ (0.0116 g), NiO (0.0436 g), $Al_2O_3$ (0.0072) and sucrose (0.2000 g) was finely ground and mixed, followed by the firing process described before in Examples 2 to 6. The carbon content of the final material is 1.33% wt. Its X-ray diffractogram is similar to the examples of the present invention, showing a composite constituted of the two electrochemical phases showing 12% spinel.

The electrochemical measurements are performed using the same parameters as described above, and show high capacities similar to the present invention, to respectively 190 Ah/kg, as illustrated in FIG. 7. Seemingly, the derivative curve dx/dV exhibits the typical peaks (arrow in FIG. 7) that are characteristic for the presence of the spinel phase.

As a conclusion, the present invention allows to obtain a composite material comprising two electrochemical active phases formed in-situ by a reduced synthesis temperature under controlled atmosphere. The high reversible capacity at high current densities and the good cycling capabilities allows the application in high power rechargeable Li-ion batteries. The high working potential and low toxicity of the negative electrode material enables a higher security and is environmental friendly.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A composite negative active material for a lithium battery, comprising:
    a carbon substituted ramsdellite phase having a general formula $Li_{2-4c}C_cTi_3O_7$, wherein $0.1 < c < 0.5$; and
    a spinel phase having a general formula $Li_{1+x}Ti_{2-x}O_4$ wherein $0 < x \le 0.33$, said active material comprising more than 0.1 mol % of the spinel phase.

2. The active material of claim 1, wherein said active material comprises more than 1 mol % of the spinel phase.

3. The active material of claim 1, having a carbon content of 1.0 to 1.5 wt %.

4. The active material of claim 1, having a spinel content between 5 and 16 mole %.

5. The active material of claim 4, having a spinel content between 8 and 11 mole %.

6. The active material of claim 1, comprising at least 99 mole % of both of said carbon substituted ramsdellite phase having a general formula $Li_{2-4c}C_cTi_3O_7$ and said spinel phase having a general formula $Li_{1+x}Ti_{2-x}O_4$ with $0 < x \le 0.33$.

7. A secondary rechargeable battery having an anode material comprising the active material of claim 1.

8. A method of manufacturing the active material of claim 1, comprising:
    grinding and mixing a lithium compound, a titanium compound, a C precursor compound, an iron compound and a M and M' compound, by ball milling to obtain a mixture;
    sintering said mixture at a temperature above 950° C.; and
    quenching said sintered material,
    wherein said sintering is performed in a gaseous atmosphere comprising a reducing agent.

9. The method of claim 8, wherein said reducing agent is selected from the group consisting of hydrogen, hydrocarbon, and carbon monoxide.

10. The method of claim 8, wherein the reducing agent comprises argon gas.

11. The method of claim 10, wherein said gaseous atmosphere comprises an argon-hydrogen mixture with 1 to 10 vol % $H_2$.

12. The method of claim 11, wherein said gaseous atmosphere comprises an argon-hydrogen mixture with 3 to 10 vol % $H_2$.

13. A composite negative active material for a lithium battery, comprising a carbon substituted ramsdellite phase having a general formula $Li_{2+v-4c}C_cTi_{3-w}Fe_xM_yM'_zO_{7-\alpha}$, wherein $0.1 < c < 0.5$, wherein M and M' are metal ions having an ionic radius between 0.5 and 0.8 Å and forming an octahedral structure with oxygen; wherein M and M' have formal oxidation numbers n and n', respectively;
    wherein $-0.5 \le v \le +0.5$; $y+z>0$; $x+y+z=w$; $0<w\le 0.3$; and $0.1 < c \le (2+v)/4$; and
    wherein $\alpha$ is related to the formal oxidation numbers n and n' of M and M' by the relation $2\alpha = -v+4w-3x-ny-n'z$; and
    a spinel phase having a general formula $Li_{1+x'}Ti_{2-x'}O_4$ wherein $0 < x' \le 0.33$, said active material comprising more than 0.1 mol % of the spinel phase.

14. The active material of claim 13, wherein M and M' are different metals selected from the group consisting of $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^{3+}$, and $Sb^{5+}$.

15. The active material of claim 14, wherein $M=Ni^{2+}$.

16. The active material of claim 14, wherein $M'=Al^{3+}$.

* * * * *

UNITED STATES PATENT AND TRADEMARK OFFICE
CERTIFICATE OF CORRECTION

PATENT NO. : 8,628,694 B2
APPLICATION NO. : 13/260760
DATED : January 14, 2014
INVENTOR(S) : Van Thournout et al.

It is certified that error appears in the above-identified patent and that said Letters Patent is hereby corrected as shown below:

On the Title Page, Item (73) Assignees, "Universite Montpellier" should read
--Universite Montpellier 2--.

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,628,694 B2  
APPLICATION NO. : 13/260760  
DATED : January 14, 2014  
INVENTOR(S) : Van Thournout et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this
Twenty-second Day of September, 2015

Michelle K. Lee
*Director of the United States Patent and Trademark Office*